United States Patent [19] [11] 4,173,180

Reiland [45] Nov. 6, 1979

[54] BACON COOKING APPARATUS

[76] Inventor: Peter M. Reiland, 27 8th Ave., Milford, Conn. 06460

[21] Appl. No.: 877,337

[22] Filed: Feb. 13, 1978

Related U.S. Application Data

[63] Continuation-in-part of Ser. No. 859,085, Dec. 9, 1977, abandoned.

[51] Int. Cl.[2] .............................................. A47J 37/06
[52] U.S. Cl. ...................................... 99/391; 99/393; 99/400; 99/427; 99/446; 99/450
[58] Field of Search ................ 99/375, 349, 400, 402, 99/385, 389, 390, 391, 393, 426, 427, 450, 446; D7/87, 88, 89

[56] References Cited

U.S. PATENT DOCUMENTS

| 1,450,381 | 4/1923 | Mieville | 99/400 X |
| 1,617,558 | 2/1927 | Wolcott | 99/390 |
| 1,690,570 | 11/1928 | Dalby | 99/400 X |
| 2,031,259 | 2/1936 | Fox | 99/375 |
| 2,102,097 | 12/1937 | Sherman | 99/427 |
| 2,157,303 | 5/1939 | Penrose | 99/349 X |
| 3,010,383 | 11/1961 | Greene | 99/349 X |
| 3,352,227 | 11/1967 | Litman | 99/349 X |
| 3,394,648 | 7/1968 | Kring | 99/446 X |
| 3,593,648 | 7/1971 | Walters | 99/402 |

*Primary Examiner*—Billy J. Wilhite
*Attorney, Agent, or Firm*—DeLio and Montgomery

[57] ABSTRACT

Apparatus for cooking food in strip form including a base, a first support rigidly affixed to the base, a second support hingedly affixed to the base and a drip tray. Both support means include heating means and integral mesh means for supporting the food to be cooked.

3 Claims, 6 Drawing Figures

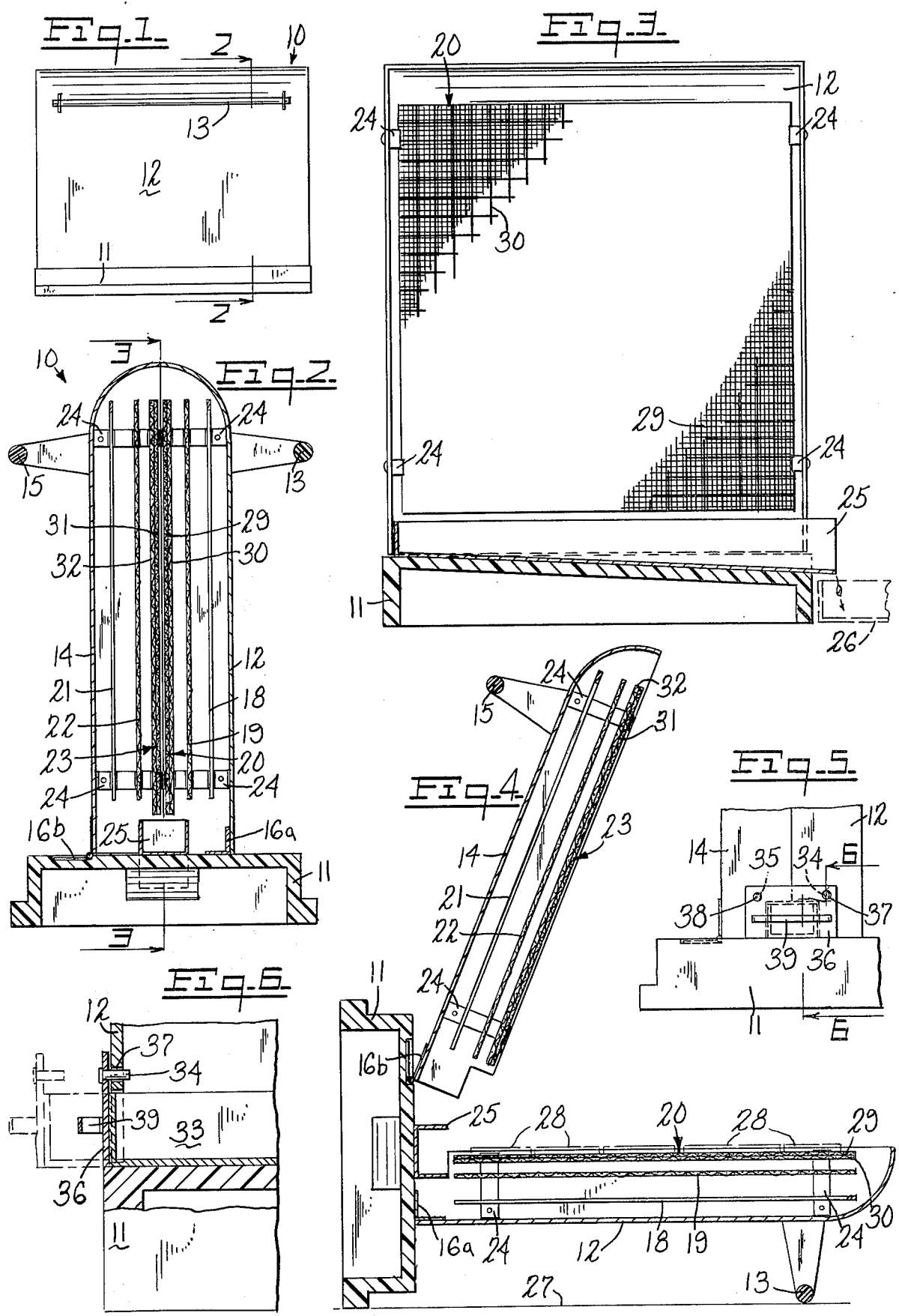

BACON COOKING APPARATUS

This is a continuation-in-part of application Ser. No. 859,085 filed Dec. 9, 1977, now abandoned.

This invention relates generally to the field of cooking apparatus and more specifically to apparatus for cooking food in strip form.

Heretofore, boiling and frying food in strip form, for example bacon, has been messy, expensive, time consuming and wasteful of energy. Normally, such food is cooked in a frying pan or under a broiler, on one side at a time. While cooking, grease often splatters onto the stove top or oven and also onto people in the vicinity. The stove top must then be cleaned after the meal is prepared. Grease splattering onto nearby people can potentially cause severe burns, damage the eyes, and some discomfort. Furthermore, energy escapes through the pan into the air, unduly heating the kitchen. Also, since one side is cooked at a time, cooking normally takes twice as long as it would if both sides were cooked simultaneously.

The invention provides apparatus for cooking both sides of food in strip form simultaneously, while suppressing grease splatter and reducing energy comsumption.

Briefly stated, the invention provides apparatus for cooking food in strip form, including a base and two support members affixed thereto. One of the support members is rigidly affixed to the base, and the other is hingedly affixed thereto so as to swing open and away from the rigidly affixed support member. Each support member includes a means for supporting the stip material, and a heating element. The apparatus further includes a drip tray to catch the drippings drained from the food.

It is therefore an object of this invention to provide a new and improved apparatus to uniformly and efficiently cook food in strip form with the minimum of mess and inconvenience.

It is another object of the invention to provide an apparatus to support food in strip form to be cooked on both sides simultaneously.

It is yet another object to provide apparatus including means for allowing juices and grease to drain from food when it is cooking providing substantially less greasy cooked food.

The features of the invention which are believed to be novel are particularly pointed out and distinctly claimed in the concluding portion of the specification. However, the invention, both as to its organization and operation, together with further objects and advantages hereof, may best be appreciated by reference to the following detailed description taken in conjunction with the drawings, in which:

FIG. 1 is a front elevational view of apparatus embodying the invention;

FIG. 2 is a sectional view taken along line 2—2 in FIG. 1;

FIG. 3 is a sectional view taken along line 3—3 in FIG. 2;

FIG. 4 is an end view partially in section showing apparatus in open loading position;

FIG. 5 is an end view of a second embodiment of the invention; and

FIG. 6 is a view taken along 6—6 in FIG. 5.

FIG. 1 shows a cooking apparatus 10 including a base 11, a support 12 and a handle 13 projecting from support member 12. As exemplified in FIG. 2, cooking apparatus 10 includes a second support member 14 having a handle 15 extending therefrom.

Support member 12 is rigidly affixed to base 11 through angle bracket 16a. Support member 14 is hingedly affixed to base 11 through hinge 16b and is adapted to swing outwardly away from support member 12 as exemplified in FIG. 4.

Support member 12 supports a heating element 18, a splatter guard 19 and strip support 20. Support member 14, similarly, supports heating element 21, splatter guard 22 and strip support 23. Strip supports 20 and 23 cooperate to pinch the strip food therebetween when members 12 and 14 are in the closed position as shown in FIG. 2. Heating elements 18 and 21, splatter guards 19 and 22 and strip supports 20 and 23, are supported by respective brackets 24. The brackets may comprise, for example, strip material having accordion folds to accommodate members 18 through 23.

Apparatus 10 further includes a drip tray 25 supported by base 11 situated beneath the strip supports 20 and 23. The base of the drip tray 25 is tilted to allow the drippings to flow to one end thereof. Optionally, the downstream end of the drip tray 25 may be opened to allow the drippings into a receptacle 26.

In operation, apparatus 10 is tilted to the position shown in FIG. 4, the handle of rigidly affixed support member 12 resting on counter top 27. Apparatus 10 is opened by swinging hinged support member 14 away from rigidly affixed support member 12. The strip material 28 shown in broken lines in FIG. 4 is positioned on strip support 20, and the support member 14 is then returned to the closed position. Strip material 28 is then pinched between support 20 and support 23. Apparatus 10 is then tilted to the position shown in FIG. 2, the heating elements 18 and 21 are actuated and the food is cooked. The food is then removed by tilting the apparatus again to the position in FIG. 4 opening the apparatus and removing the food.

Preferably, strip support 20 comprises two mesh screens 29 and 30, screen 29 being relative fine mesh, and screen 30 being relatively coarse mesh. Similarly, support 23 includes screen 31 and 32, screen 31 being of fine mesh and screen 32 being of coarse mesh. The mesh screens are preferably of stainless steel wire or other suitable material to prevent the food from sticking thereto. The mesh of screens 29 and 31 is large enough to allow heat from the heating elements to reach the strips substantially unimpeded while being sufficiently narrow to catch the drippings cooking from the food and to prevent it from splattering. Furthermore, mesh screens 29 and 31 remove the drippings by allowing them to drain downwardly away from the strips supported thereby.

The mesh of coarse mesh 30 and 32 is chosen so as to be able to support fine mesh 29 and 31 with strips 28 therebetween.

Splatter guards 19 and 22 are also preferably wire mesh. The splatter guards prevent drippings that may splatter through supports 20 and 23 from reaching heating elements 18 and 21.

As exemplified in FIGS. 5 and 6, a second embodiment includes an interlock associated with a drip tray 33 to prevent support members 12 and 14 from opening when the interlock is engaged. Members 12 and 14 each have an aperture 34 and 35, respectively, in the end faces thereof. Tray 33 is longitudinally moveable with respect to base 11, and supports a plate 36. Plate 36 supports a stud 37 projecting therefrom in cooperable relationship with aperture 34, and a second stud 38 in cooperable relationship with aperture 35 when member 14 is in the closed position. Plate 36 further supports a handle 39 by which the tray and interlock may be withdrawn, allowing member 14 to pivot and the apparatus 10 to be opened.

It may thus be seen that the objects of the invention set forth as well as those made apparent from the foregoing description are efficiently attained. While preferred embodiments of the invention have been set forth for purposes of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. Cooking apparatus comprising:
   a base;
   a first support member hingedly attached to said base and a second support member fixedly attached to said base;
   each of said support members including heating means and integral means for supporting the food to be cooked, each of said food support means including an outer support means of fine mesh screen adapted to receive the food to be cooked and drain the drippings therefrom and an inner support means adapted to support said outer support means; and
   a drip tray positioned to receive drippings from the cooking food.

2. Cooking apparatus comprising:
   a base;
   a first support member hingedly attached to said base and a second support member fixedly attached to said base;
   each of said support members including heating means and integral means for supporting the food to be cooked, each of said food support means including an outer support means of coarse mesh screen adapted to receive the food to be cooked and drain the drippings therefrom and an inner support means adapted to support said outer support means; and
   a drip tray positioned to receive drippings from the cooking food.

3. Cooking apparatus comprising:
   a base;
   a first support member hingedly attached to said base and a second support member fixedly attached to said base;
   each of said support members including heating means and integral means for supporting the food to be cooked;
   a drip tray positioned to receive drippings from the cooking food; and
   each of said support members including means defining an aperture with said drip tray having means adapted to engage said support member apertures when said support members are closed to lock the support members closed.

* * * * *